United States Patent
Ota et al.

(10) Patent No.: US 6,478,386 B2
(45) Date of Patent: Nov. 12, 2002

(54) CONTROL DEVICE FOR ANTILOCK BRAKE DEVICE

(75) Inventors: Atsuo Ota; Shinji Goto, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,300

(22) Filed: Mar. 29, 2001

(65) Prior Publication Data

US 2001/0030465 A1 Oct. 18, 2001

(30) Foreign Application Priority Data

Mar. 29, 2000 (JP) .................................... 2000-091190

(51) Int. Cl.[7] .............................................. B60T 8/42
(52) U.S. Cl. .................................... 303/115.2; 303/162
(58) Field of Search ........................... 303/115.2, 162

(56) References Cited

U.S. PATENT DOCUMENTS 5,249,848 A * 10/1993 Matsuto et al. .......... 303/115.2
5,257,856 A * 11/1993 Ota et al. ................. 303/115.2
5,496,102 A * 3/1996 Dimatted et al. ........... 303/162
5,573,313 A * 11/1996 Suzuki et al. ............ 303/115.2

FOREIGN PATENT DOCUMENTS

JP          A5 079543         3/1993

* cited by examiner

*Primary Examiner*—Matthew C. Graham
(74) *Attorney, Agent, or Firm*—Birch, Stewart, Kolasch & Birch, LLP

(57) ABSTRACT

A control device for an antilock braking system is disclosed. When a target angle of a crankshaft provided to a servomotor of an ABS that is closer to a turning limit than to a predetermined updating stop angle, the target angle is set at the updating stop angle or the vicinity thereof. An expander piston is displaced to an open end side corresponding to the turning limit of the crankshaft by an elastic force of a return spring after being displaced to a position corresponding to an updating stop angle for the crankshaft or the vicinity thereof. This arrangement permits reliable, accurate displacement of the expander piston to a predetermined position corresponding to a turning limit of the crankshaft without causing the servomotor to consume needless electric current.

15 Claims, 6 Drawing Sheets

CONTROL DEVICE FOR ANTILOCK BRAKE DEVICE

BACKGROUND OF THE INVENTION

1. Field of the Invention

The present invention relates to a control device for an antilock brake system, and more particularly to a control device for an antilock brake system in which braking hydraulic pressure is controlled by a turning angle of a servomotor.

2. Background Art

An antilock brake system (ABS) for performing optimum brake control has been mounted on conventional vehicles. In the ABS, a slip rate is calculated from the rotation speed of a wheel of the running vehicle and the vehicle velocity, and the optimum brake control is performed based on the calculated slip rate.

In an ABS according to the conventional art, as disclosed in Japanese Pre-examination Patent Publication (KOKAI) No.Hei 5-79543 (1993), an actuator for an antilock brake for reducing, maintaining and increasing the braking hydraulic pressure is connected between a master cylinder and a caliper cylinder. The master cylinder is responsible for converting a brake operation to hydraulic pressure. The actuator incorporates a servomotor for displacing a crankshaft of the actuator based on slip rate information of the vehicle, and the crankshaft opens and closes a cut valve through an expander piston, thereby controlling the braking hydraulic pressure applied to the caliper cylinder.

Stopper members are preliminarily provided at an upper limit position and a lower limit position of a turning range of the crankshaft. When the upper limit position or the lower limit position is given as a target angle to the servomotor, the crankshaft or a member in the vicinity of the crankshaft is turned until a positioning member provided in the vicinity of the crankshaft/member comes to collide with the stopper member.

During non-operation of ABS control, the expander piston is retracted to a first side so that the cut valve is maintained in an opened state. The angle of the crankshaft for locating the expander piston at the first side is set at a turning limit for the crankshaft. Therefore, at the end of ABS control, the turning limit of the crankshaft is given as a target angle to the servomotor, and the crankshaft is turned until a positioning member provided at a portion of the crankshaft collides with the stopper member.

According to the conventional arrangements mentioned above, the target angle given to the servomotor is set at an angle exceeding the turning limit of the crankshaft so that the expander piston is retracted to the first end side at the end of ABS control, irrespective of assembly precision of the actuator, crankshaft and the like, and individual variations of component parts.

Therefore, even when the positioning member on the crankshaft side collides with the stopper member and the servomotor is actually locked, the servomotor is continually biased since the actual angle of the crankshaft never reaches the target angle. Accordingly, this results in needless electric current flows to the servomotor.

SUMMARY OF THE INVENTION

The present invention overcomes the shortcomings associated with the related art and achieves other advantages not realized by the related art.

It is an aspect of the present invention to provide a control device for an antilock brake system which solves the above-mentioned problems of the conventional art.

It is an aspect of the present invention to provide a control device in which an expander piston displaced by a crankshaft connected to a servomotor can be reliably displaced to a predetermined position corresponding to a turning limit of the crankshaft.

It is a further aspect of the crankshaft to provide improved and reliable expander piston displacement/positioning without consuming needless electric current from the servomotor.

These and other aspects of the present invention are accomplished by a control device for an antilock brake system comprising an input hydraulic chamber in communication with a master cylinder; an output hydraulic chamber in communication with a caliper cylinder of a brake; a cut valve in communication with the input hydraulic chamber and the output hydraulic chamber for performing a cutoff operation; an expander piston controlling a position of the cut valve, the expander piston having a cut valve opening position and a cut valve closing position, the expander piston closing the cut valve by increasing a volume of the output hydraulic chamber in the cut valve closing position; a crank mechanism for displacing the expander piston between the cut valve opening position and the cut valve closing position, the crank mechanism including an actual crank angle; a crank mechanism operating angular range including the actual crank angle, the crank mechanism operating angular range corresponding to any expander piston position between the cut valve opening position and the cut valve opening position, and including the cut valve opening position and the cut valve closing position; a servomotor for controlling the actual crank angle of the crank mechanism according to a target angle, the target angle only being within the crank mechanism operating angular range; and a stopper member for setting a turning limit of the crank mechanism, the turning limit preventing the crank mechanism from turning in excess of a predetermined maximum actual crank angle corresponding to the cut valve opening position, the target angle being set at the predetermined maximum actual crank angle during an ABS non-operational state, and the expander piston being retracted to the cut valve closing position during an ABS operational state.

These and other aspects of the present invention are further accomplished by a method of controlling the above-mentioned control device, the method comprising the steps of setting the target angle to a position preceding the predetermined maximum actual crank angle; displacing the expander piston to a position precedent to the cut valve opening position with the servomotor; and maintaining the ABS non-operational state by displacing the expander piston from the position precedent to the cut valve opening position with a spring force from a return spring.

According to the above-described features, the expander piston can be displaced to a position corresponding to the turning limit of the crankshaft or the vicinity thereof without causing the servomotor to consume needless electric current.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not intended to limit the present invention to the embodiments shown, and wherein.

DETAILED DESCRIPTION OF THE PREFERRED EMBODIMENTS

Figure 1:
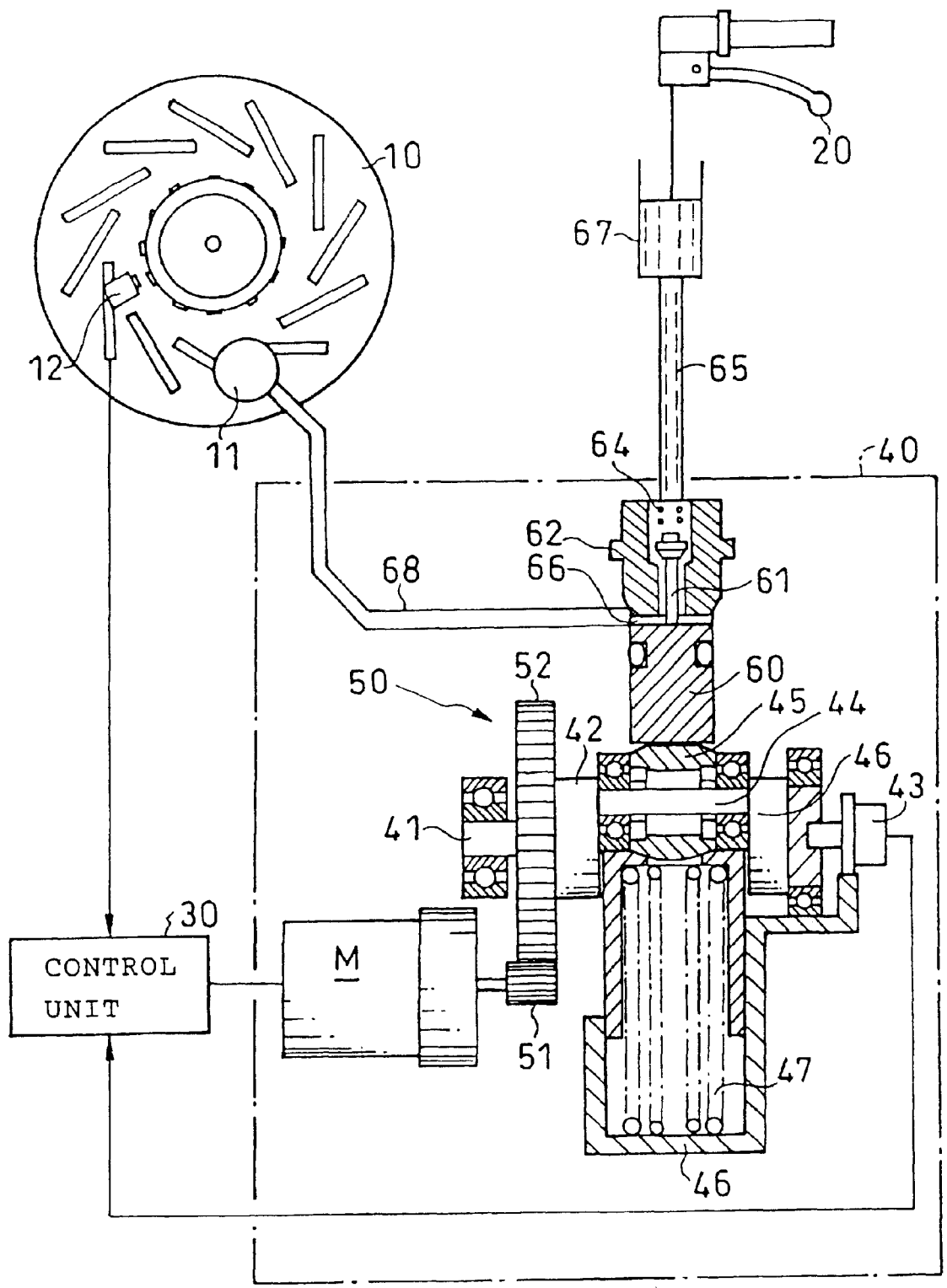
FIG. 1 is a schematic view of a brake control system according to an embodiment of the present invention.
Figure 2:
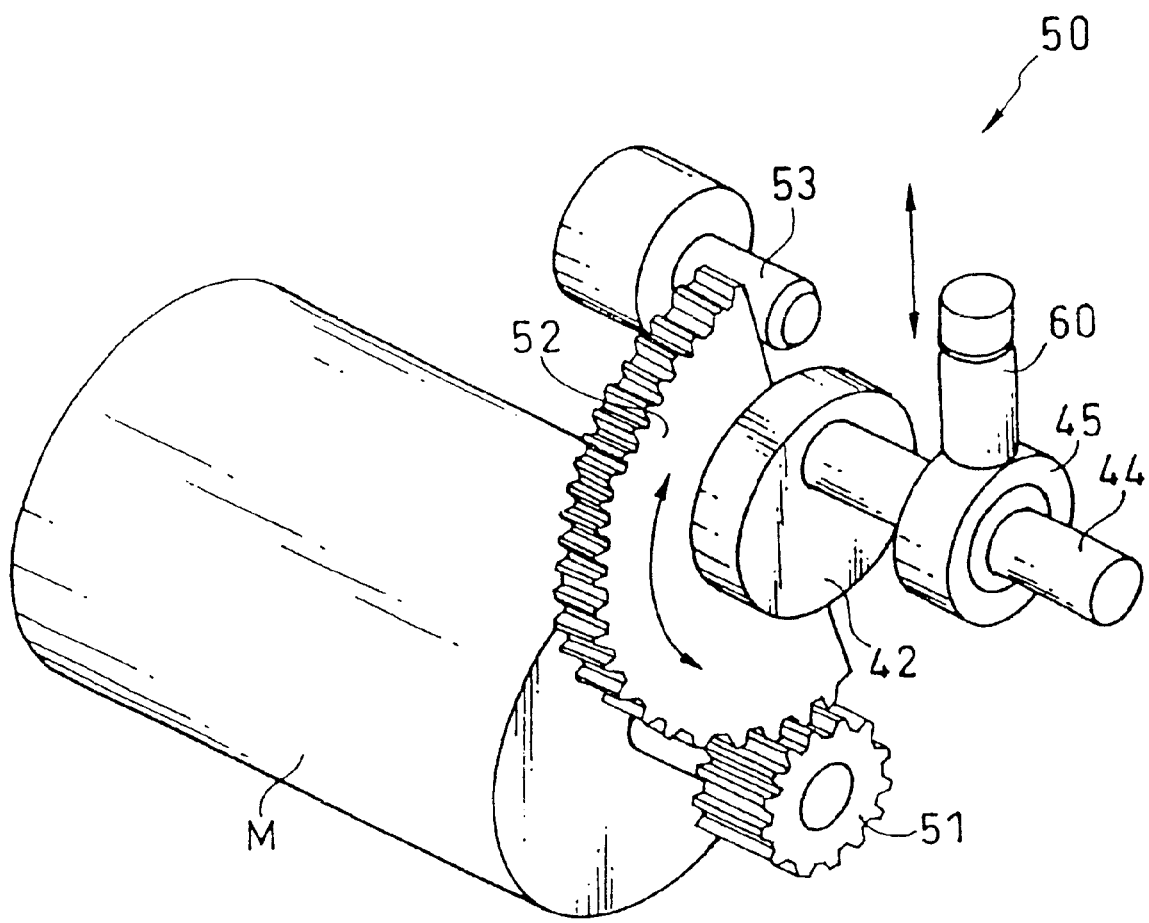
FIG. 2 is a side view of a modulator according to an embodiment of the present invention.
Figure 3:
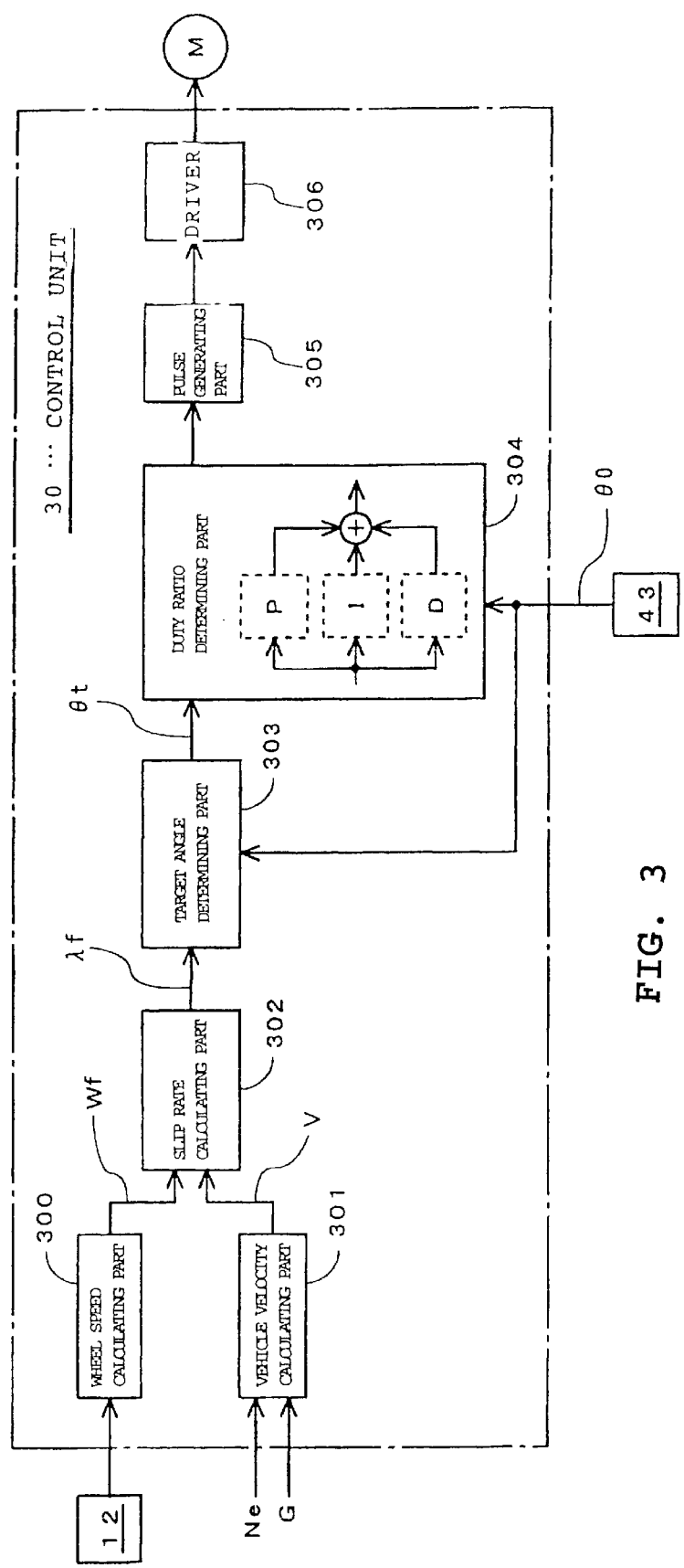
FIG. 3 is a schematic view of a portion of the control unit of FIG. 1.
Figure 4:
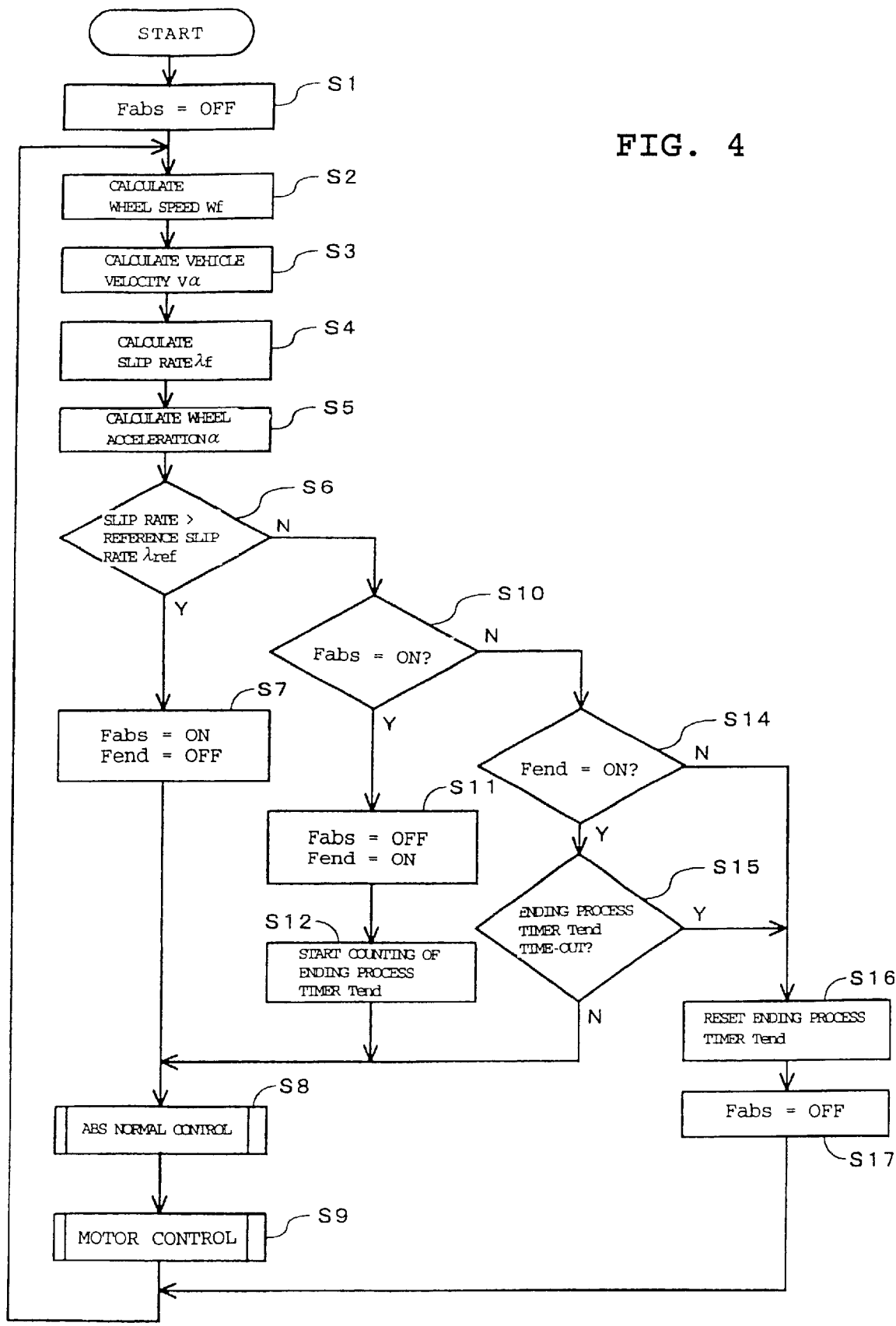
FIG. 4 is a flowchart of the operation of the invention according to an embodiment of the present invention.
Figure 5:
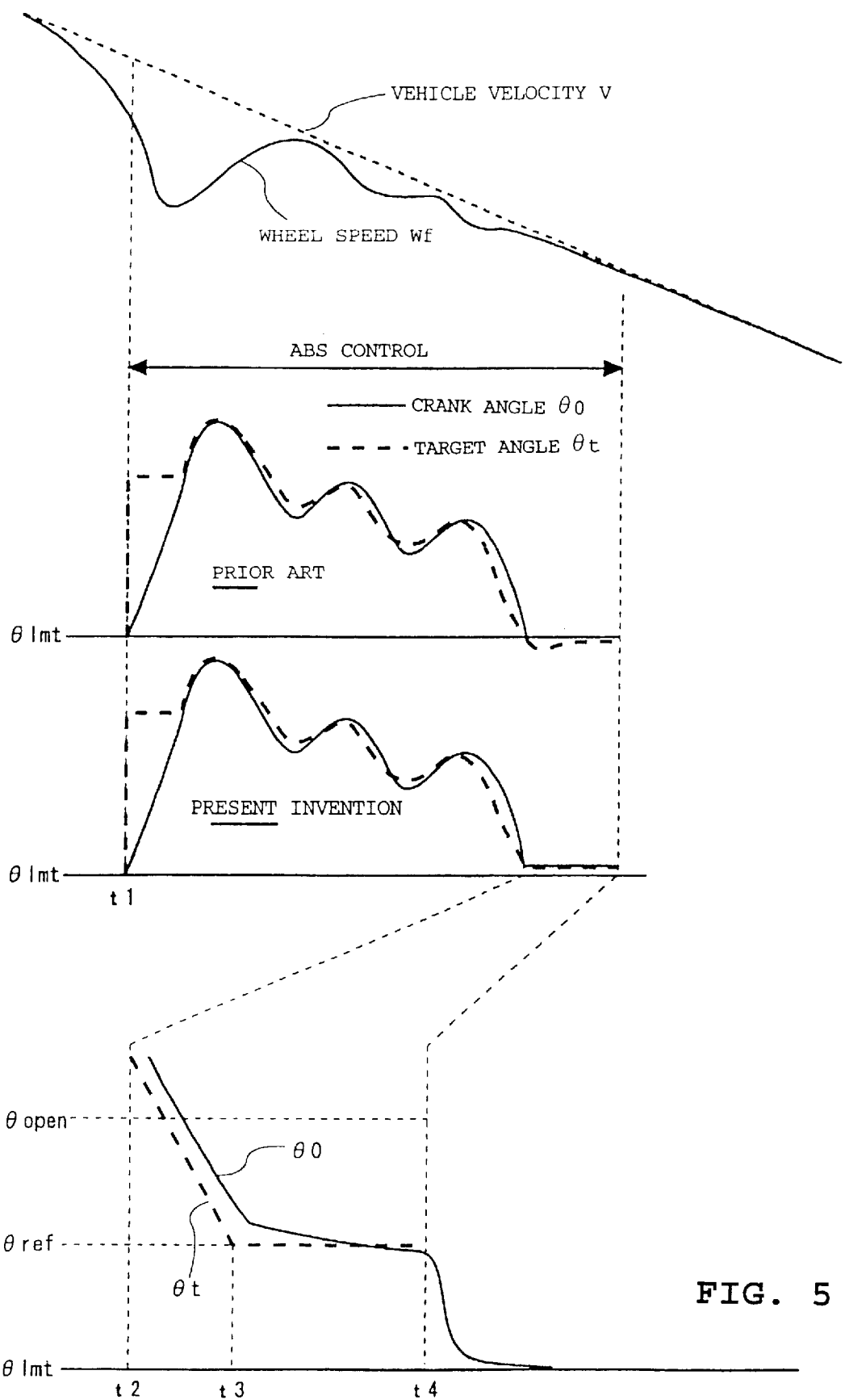
FIG. 5 is a graphical view of the operation of the invention according to an embodiment of the present invention.
Figure 6:
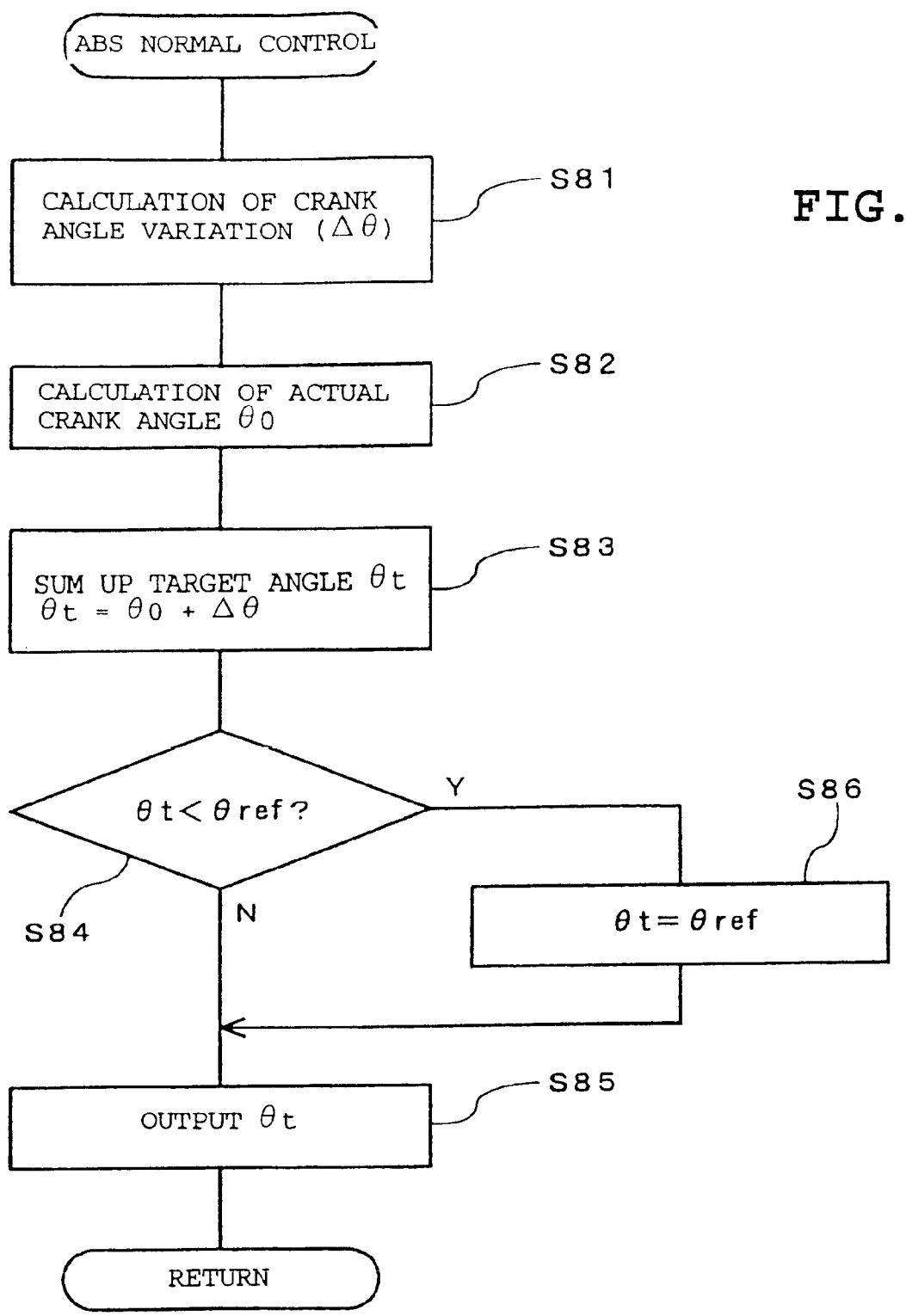
FIG. 6 is a flowchart showing the operation of a control device according to an embodiment of the present invention.

Hereinafter, the present invention will be described in detail with reference to the accompanying drawings. FIG. 1 is a schematic view of a brake control system according to an embodiment of the present invention. FIG. 2 is a side view of a modulator according to an embodiment of the present invention. FIG. 3 is a schematic view of a portion of the control unit of FIG. 1. FIG. 4 is a flowchart of the operation of the invention according to an embodiment of the present invention. FIG. 5 is a graphical view of the operation of the invention according to an embodiment of the present invention. FIG. 6 is a flowchart showing the operation of a control device according to an embodiment of the present invention.

FIG. 1 is a schematic view of a brake control system according to an embodiment of the present invention. A description of a brake control system incorporating an embodiment of the present invention will be made with reference to an example of the system to the front wheel.

The brake system includes a disk plate 10 arranged at a rotational shaft of the front wheel, a brake lever 20 fitted to a steering handle portion of the vehicle, a control unit 30, and a modulator 40 acting as an actuator for controlling the braking hydraulic pressure.

A caliper cylinder 11 supplied with braking hydraulic pressure from the modulator 40 generates a braking force. A wheel speed sensor 12 is mounted to the disk plate 10 along with the caliper cylinder 11. The rotating speed of the front wheel detected by the wheel speed sensor 12 is inputted to the control unit 30.

A DC servomotor M of the modulator 40 is connected with a crank mechanism 50. As shown in FIG. 2, the crank mechanism 50 comprises a pinion 51 axially attached to the rotary shaft of the DC servomotor M. A semicircular crank gear 52 is engaged with the pinion 51.

A crankshaft 41 axially supports the crank gear 52. A crank pin 44 is eccentrically connected to the crank gear 52 through a crank arm 42, and a crank arm 46 is connected to a second end of the crank pin 44. The turning range of the crank gear 52 is limited by a stopper pin 53. A potentiometer 43 serving as a position sensor is fitted to the crank arm 46.

A cam bearing 45 is rotatably fitted to the crank pin 44, and is normally pressed toward one end by a spring force of a return spring 47 contained in a spring containing portion 48. An expander piston 60 is disposed in contact with the cam bearing 45 at a position symmetrical with a pressing position of the return spring 47. Therefore, as the cam bearing 45 is moved up and down, the expander piston 60 is displaced up and down in response thereto. This relationship results in the opening and closing of a cut valve 61.

A cut valve containing portion 62 incorporating the cut valve 61 is provided at an upper portion of the expander piston 60. A master cylinder 67 is connected to an input hydraulic chamber 64 of the cut valve containing portion 62 through piping 65. The caliper cylinder 11 is connected to an output hydraulic chamber 66 of the cut valve containing portion 62 through piping 68. It shall be appreciated by one of ordinary skill in the art that piping 65 and 68 may include multiple sections of piping or tubing for accomplishing distribution of pressurized braking fluid to multiple locations.

The master cylinder 67 and the caliper cylinder 11 are connected to each other through the piping 65, the modulator 40 and the piping 68. This hydraulic oil/braking circuit is filled with a hydraulic oil suitable for the vehicle's braking system. The master cylinder 68 converts an operation on the brake lever 20 into an oil pressure, and transmits the oil pressure to the cut valve containing portion 62.

The control unit 30 controls the turning angle of the DC servomotor M based on wheel speed information read from the wheel speed sensor 12 and an output value of the potentiometer 43 representing the angle of the crank mechanism 50 at the position of the crank arm 46.

In the arrangement described hereinabove, when the ABS is not operated, the crank gear 52 has been turned to a turning limit restricted by the stopper pin 53. Therefore, the expander piston 60 is located at one end side, and the cut valve 61 is open, so that a braking pressure in response to a brake operation is supplied to the caliper cylinder 11.

When the ABS is in an operating state, the crank gear 52 is turned by the servomotor M, and the expander piston 60 is lowered toward the other end side. By this action, the cut valve 61 is closed, and the volume of the output hydraulic chamber 66 is increased according to the position of the expander piston 60. Accordingly, the braking pressure supplied to the caliper cylinder 11 is reduced according to the position of the expander piston 60.

While the above description has been made in accordance with a brake control system arranged for a front wheel of a vehicle, a similar brake control system can also be arranged for the rear wheel.

FIG. 3 is a schematic view of a portion of the control unit 30 shown in FIG. 1. A wheel speed calculating part 300 calculates the wheel speed Wf based on an output signal from the wheel speed sensor 12. A vehicle velocity calculating section 301 calculates vehicle velocity V based on engine revolution number Ne and speed change gear stage G (or the wheel speed Wf or the like). A slip rate calculating section 302 calculates slip rate $\lambda f$ of a wheel based on the vehicle velocity V and the wheel speed Wf. A target angle determining section 303 determines a target angle $\theta t$ for the crank mechanism 50 based on the slip rate $\lambda f$.

A duty ratio determining section 304 determines a duty ratio of driving pulses supplied to the servomotor M by PID control. A pulse generating section 305 generates a train of pulses based on the determined duty ratio. A driver 306 drives the servomotor M based on the generated train of pulses.

Next, the operation of the present embodiment will be described referring to the flowcharts of FIGS. 4 and 6, and the graphical time chart of FIG. 5. FIG. 4 is a flowchart of the operation of the invention according to an embodiment of the present invention. FIG. 5 is a graphical view of the operation of the invention according to an embodiment of the present invention. FIG. 6 is a flowchart showing the operation of a return control according to an embodiment of the present invention.

In FIG. 5, the relationship between the target angle θt and actual angle θo of the crank mechanism 50, controlled according to the relationship between the vehicle velocity V and the wheel speed Wf, is shown for both the prior art and the present invention.

In step S1, a value representing the non-operating condition of ABS (OFF representative value) is set into an ABS flag (Fabs) described later. In step S2, an output signal from the wheel speed sensor 12 is taken into the wheel speed calculating section 300, and the wheel speed Wf of the front wheel is calculated. In step S3, the vehicle velocity V is obtained in the vehicle velocity calculating section 301. In this embodiment, the vehicle velocity V is obtained based on the relationship between the engine revolution number Ne and the speed change gear stage G. In step S4, the slip rate λf is calculated in the slip rate calculating section 302 based on the wheel speed Wf and the vehicle velocity V. In step S5, wheel acceleration α is calculated by differentiating the wheel speed Wf.

In step S6, a reference slip rate λref given as a function of the wheel acceleration α and the slip rate λf are compared with each other. Here, when the slip rate λf exceeds the reference slip rate λref at time t1 in FIG. 5, step S7 is entered to operate the ABS. In step S7, a value representing the operating condition of the ABS (ON representative value) is set in the ABS flag (Fabs). Further, an ending process flag (Fend) which is set when the ABS executes an command to end the process is reset. In step S8, a target angle θt is determined in the target angle determining section 303.

FIG. 6 is a flowchart showing the operation of a control device according to an embodiment of the present invention. FIG. 6 shows the operation of the target angle determining section 303 in step S8 of FIG. 4.

As seen in step S81 of FIG. 6, angle variation Δθ of the crank mechanism 50 is calculated based on the slip rate λf. In step S82, the actual angle θ0 of the crank mechanism 50 is calculated based on an output signal from the potentiometer 43. In step S83, the actual angle θ0 and the angle variation Δ0 of the crank mechanism 50 are summed up, to determine the target angle θt. In step S84, the target angle θt and an updating stop angle θref are compared with each other.

As shown in FIG. 5, the updating stop angle θref is preliminarily set to be precedent to the turning limit θlmt at which the turning of the crank gear 52 is restricted by the stopper pin 53, and on the valve opening side of a valve opening angle θopen at which the cut valve 61 is shifted from a closed condition to an open condition. Specifically, the updating stop angle θref is set within an angle range in which the cut valve is open and the driver's brake operation is reflected on the braking force.

Since in the beginning of the process the target angle θt has not reached the updating stop angle θref, step S85 is entered and the target angle θt is outputted to the duty ratio determining section 304. In the duty ratio determining section 304, a PID control is executed for causing the actual angle θ0 of the crank mechanism 50 detected by the potentiometer 43 to coincide with the target angle θt. A a duty ratio of driving pulses supplied to the servomotor M is also determined.

Returning to FIG. 4, in step S9, a train of pulses generated by a pulse generating section 305 based on the duty ratio are supplied to the servomotor M through a driver 306. Such an ABS normal control is continued as long as the slip rate λf is in excess of the reference slip rate λref.

When the slip rate λf at step S6 is detected to be less than the reference slip rate λref at time t2 in FIG. 5, step S10 is entered. In step S10, the ABS in-operation flag (Fabs) is referenced. Since the ABS in-operation flag Fabs is already set, step S11 is entered. In step S11, the ABS in-operation flag Fabs is reset, and the ending process flag Fend is set. In step S12, an ending process timer Tend starts counting.

Thereafter, at time t3 in FIG. 5, the target angle θt of the crank mechanism 50 reaches the updating stop angle θref. When this condition is detected in step S84 in FIG. 6, the target angle θt is set at the updating stop angle θref in step S86. In step S85, the updating stop angle θref is outputted as the target angle θt. As a result, and as shown in greater detail at a lower portion of FIG. 5, the target angle θt of the crank mechanism 50 is fixed at the updating stop angle θref, and the actual angle θ0 of the crank mechanism 50 gradually converges to the updating stop angle θref.

During the next period, control proceeds from step S10 to S14, and the ending process flag Fend is referenced. Here, since the ending process flag Fend has been set, step S15 is entered. In step S15, it is determined if the ending process timer Tend has timed-out. If time-out has not occurred, the step S8 is entered, and the ABS control for fixing the target angle θt at the updating stop angle θref without updating is continued.

Thereafter, the ending process timer Tend times-out at time t4 in FIG. 5. When this is detected in step S15, the ending process timer Tend is reset in step S16. In step 17, the ABS in-operation flag Fabs is reset.

After the ending process of ABS is completed as above, and the crank mechanism 50 is turned to the updating stop angle θref, the expander piston 60 is displaced to a normal retracted position by an elastic force of the return spring 47 contained in the spring containing portion 48.

Thus, according to the present embodiment, the crank mechanism turned by the servomotor M to displace the expander piston 60 is turned only to a position precedent to the turning limit thereof, and the expander piston 60 displaced to a position corresponding to the turning limit is displaced to a predetermined position by the elastic force of the return spring. Therefore, the expander piston 60 can be displaced to the predetermined position corresponding to the turning limit of the crank mechanism, without causing the servomotor to consume needless electric current.

In addition, since the updating stop angle θref is set within an angular range in which the cut valve 61 can maintain an opened condition, namely, at a position where the driver's brake operation is reflected as the braking force, the reduction of the turning speed of the crank mechanism 50 immediately before the turning limit θlmt does not affect the driver's braking operation.

According to the present invention, the following effects can be accomplished. The expander piston can be reliably displaced to a predetermined position corresponding to the turning limit of the crank mechanism, without causing the servomotor to consume needless electric current.

Since the updating stop angle is set within an angular range in which the cut valve can maintain the opened condition, namely, at a position where the driver's brake operation is reflected on the braking force, the reduction of turning speed of the crank mechanism immediately before the turning limit does not affect the driver's brake operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for an antilock brake system comprising:
    an input hydraulic chamber in communication with a master cylinder;
    an output hydraulic chamber in communication with a caliper cylinder of a brake;
    a cut valve in communication with said input hydraulic chamber and said output hydraulic chamber for performing a cutoff operation;
    an expander piston controlling a position of said cut valve, said expander piston having a cut valve opening position and a cut valve closing position, said expander piston closing said cut valve by increasing a volume of said output hydraulic chamber in said cut valve closing position;
    a crank mechanism for displacing said expander piston between said cut valve opening position and said cut valve closing position, said crank mechanism including an actual crank angle;
    a crank mechanism operating angular range including said actual crank angle, said crank mechanism operating angular range corresponding to any expander piston position between said cut valve opening position and said cut valve opening position, and including said cut valve opening position and said cut valve closing position;
    a servomotor for controlling said actual crank angle of said crank mechanism according to a target angle, said target angle only being within said crank mechanism operating angular range; and
    a stopper member for setting a turning limit of said crank mechanism, said turning limit preventing said crank mechanism from turning in excess of a predetermined maximum actual crank angle corresponding to said cut valve opening position, said target angle being set at said predetermined maximum actual crank angle during an ABS non-operational state, and said expander piston being retracted to said cut valve closing position during an ABS operational state.

2. The control device for an antilock brake system according to claim 1, further comprising a return spring for elastically displacing said expander piston between said cut valve closing position and said cut valve opening position.

3. The control device according to claim 2, said expander piston being displaced to the cut valve opening position by an elastic force of said return spring after said crank mechanism is displaced to an updating stop angle within said crank mechanism operating angular range.

4. The control device according to claim 1, wherein said stopper member is a stopper pin.

5. The control device according to claim 1, further comprising:
    a control unit controlling a turning angle of the servomotor based on a wheel speed value read from a wheel speed sensor, and an output value of a potentiometer representing said actual crank angle of the crank mechanism.

6. The control device according to claim 1, wherein said servomotor is a DC servomotor and forms a servomotor section of a modulator connected with said crank mechanism.

7. The control device according to claim 1, wherein the crank mechanism comprises
    a pinion axially attached to a rotary shaft of the servomotor, and
    a semicircular crank gear being engaged with the pinion and axially supported by a crank shaft.

8. The control device according to claim 6, wherein the crank mechanism comprises
    a pinion axially attached to a rotary shaft of the servomotor, and
    a semicircular crank gear being engaged with the pinion and axially supported by a crank shaft.

9. The control device according to claim 7, wherein a crank pin is eccentrically connected to the crank gear through a crank arm, and said crank arm is connected to a second end of the crank pin.

10. The control device according to claim 8, wherein a crank pin is eccentrically connected to the crank gear through a crank arm, and said crank arm is connected to a second end of the crank pin.

11. The control device according to claim 9 further comprising a potentiometer serving as a position sensor fitted to the crank arm.

12. The control device according to claim 9 further comprising:
    a cam bearing rotatably fitted to the crank pin, said cam bearing pressable toward a first end by a spring force; and
    a return spring contained in a spring containing portion for producing said spring force.

13. The control device according to claim 12, wherein the expander piston is engageable with the cam bearing at a position symmetrical with a pressing position of the return spring for facilitating an opening and closing operation of said cut valve.

14. The control device according to claim 11, further comprising:
    a control unit controlling a turning angle of the DC servomotor based on a wheel speed value read from a wheel speed sensor, and an output value of the potentiometer representing said actual crank angle of the crank mechanism.

15. A method of controlling the control device of claim 1, said method comprising the steps of:
    setting said target angle to a position preceding said predetermined maximum actual crank angle;
    displacing the expander piston to a position precedent to said cut valve opening position with said servomotor; and
    maintaining said ABS non-operational state by displacing the expander piston from said position precedent to said cut valve opening position with a spring force from a return spring.

* * * * *